United States Patent

Rousseau

[11] 4,409,585
[45] Oct. 11, 1983

[54] SYSTEM GOVERNING THE POSITION OF A SENSOR

[75] Inventor: Christian Rousseau, Antony, France

[73] Assignee: Regie Nationale Des Usines Renault, Boulogne-Billancourt, France

[21] Appl. No.: 244,739

[22] Filed: Mar. 17, 1981

[30] Foreign Application Priority Data

Mar. 28, 1980 [FR] France .............................. 80 06952

[51] Int. Cl.³ ........................................... G08B 21/00
[52] U.S. Cl. ........................... 340/52 R; 123/146.5 A; 340/679; 340/686
[58] Field of Search .................. 340/52 R, 671, 672, 340/679, 681, 686, 688; 324/391, 392; 335/225; 123/146.5 A

[56] References Cited

U.S. PATENT DOCUMENTS

| 2,064,093 | 12/1936 | Walters | 340/52 R |
| 2,162,166 | 6/1939 | Gorrien | 340/688 X |
| 2,263,859 | 11/1941 | Eldredge | 324/391 X |
| 2,430,305 | 11/1947 | Sheets | 340/688 X |
| 2,523,352 | 9/1950 | Behr | 340/688 X |
| 2,615,929 | 10/1952 | Rider | 324/391 X |
| 2,736,015 | 2/1956 | Gilvarry et al. | 340/52 R X |
| 3,936,684 | 2/1976 | Anselmino | 310/168 |
| 3,971,350 | 7/1976 | Hays | 123/146.5 A X |
| 4,089,316 | 5/1978 | Padgitt | 324/391 X |

FOREIGN PATENT DOCUMENTS 195183 5/1957 Fed. Rep. of Germany ...... 324/392

Primary Examiner—Glen R. Swann, III
Attorney, Agent, or Firm—Oblon, Fisher, Spivak, McClelland & Maier

[57] ABSTRACT

A system for the attachment of sensors which makes it possible to obtain different detection positions when mounted in place on a motor vehicle is disclosed. The sensor body is mounted on one of several predetermined adjustment positions on a bar fixed to the bell housing.

4 Claims, 2 Drawing Figures

SYSTEM GOVERNING THE POSITION OF A SENSOR

BACKGROUND OF THE INVENTION

1. Field of the Invention:

The present invention concerns a system for locating a sensor so as to make it possible to obtain different positions at the time of installation on an automobile, depending on the parameters sought.

2. Description of the Prior Art:

It is known that in an automobile it may be worthwhile to radially mount, in a fixed position, at least one sensor opposite a target which passes by it at, for example, at the speed of rotation of the vehicle's crankshaft. This target may be a disk made unitary with the crankshaft and featuring at its periphery mechanical irregularities which influence the sensor and, as they pass by it, induces the latter to send signals. As examples of such sensors, mention may be made of angular position sensors and velocity sensors which are widely used in automobile electronics applications.

In the case of electronic ignitions, for example, a difficulty arises if one wishes to mount the same sensor on an entire line of vehicles because of the fact that certain parameters, such as the angle of ignition advance, vary from one type of vehicle to the next. In addition, the same difficulty arises on the same type of vehicle if one wishes, without changing the sensor, to modify the ignition advance either as a function of changes in the characteristics of the motor during its life or in order to take into account temporary or local changes in the composition of fuels, especially if the protection against knocking of the engine under consideration is slight for the given advance or, finally, to permit conformity to different standards such as those for pollution control. In order to reduce the cost of parts such as electronic sensors, it is widely known that there are advantages in producing and storing large numbers of identical parts and, moreover, in avoiding the storage in the distribution network of a large number of different sensors depending on the type of vehicle for which they are designed.

SUMMARY OF THE INVENTION

The present invention makes it possible to reduce these difficulties by sliding the sensor on a fixed bar and immobilizing the sensor on the bar either during manufacture or at the time of installation on the vehicle. This bar is most frequently in the shape of the arc of a circle whose center coincides with the center of the disk made unitary with the crankshaft and bearing on its periphery the irregularities which influence the characteristics of the sensor when they pass in front of it. The sensor is fastened, either by a mechanical device such as protuberances or cotter pins or by the permanent bonding of the attachment bar, at a predetermined position along the length of the said bar, before mounting on a vehicle of a given type.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
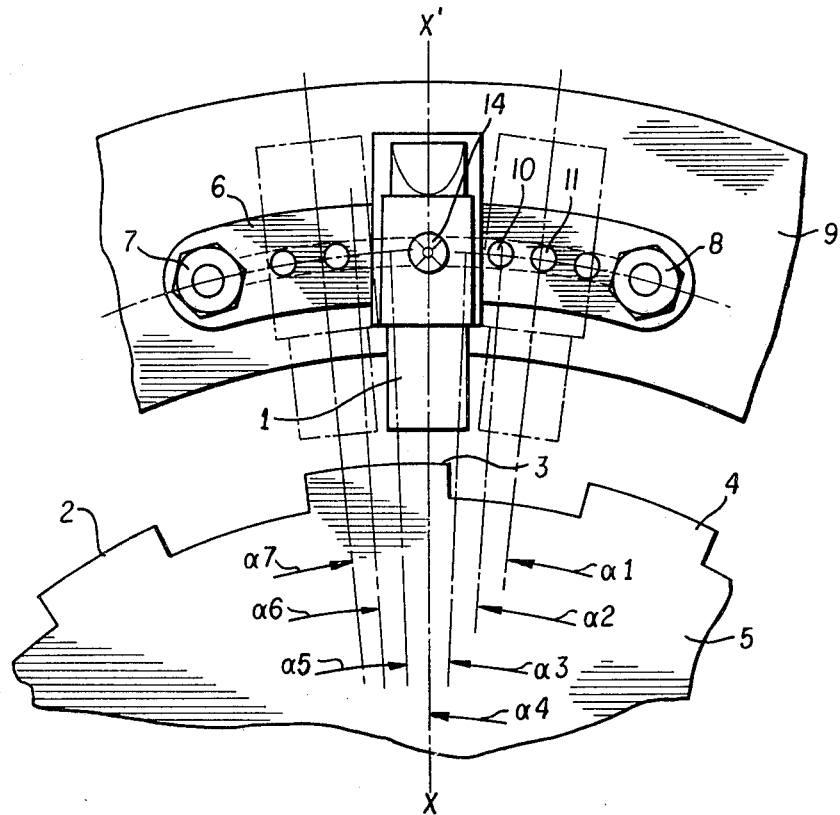
FIG. 1 represents a frontal view of a sensor and attachment bar according to the invention, and a disk made unitary with the crankshaft.
Figure 2:
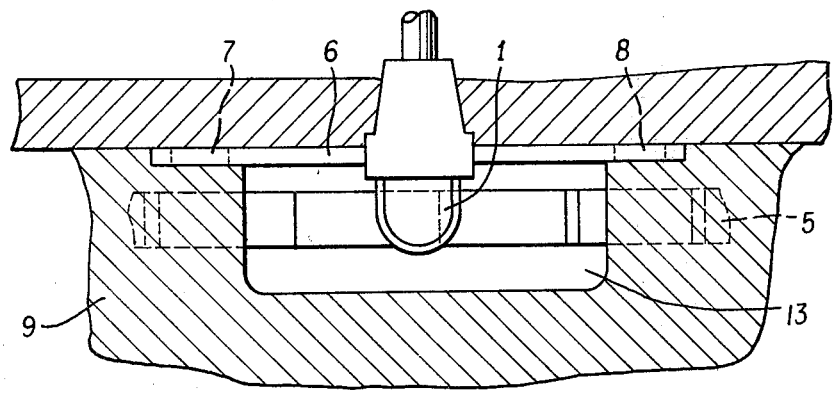
FIG. 2 represents a view, from below, of the same unit.

According to the embodiment in FIGS. 1 and 2, a sensor 1 of a known type, electromagnetic for example, generates electrical signals based on the detection of the irregularities 2 or 3 or 4, etc. on disk 5. It therefore transmits information on the velocity or angular position of the crankshaft to a computer in an associated electronic unit.

This sensor 1 is mounted so as to slide on a bar 6 which is attached, for example by two screws 7 and 8 at its ends, to the clutch bell housing 9. The bar is provided with a certain number of equidistant holes 10, 11, etc. (seven holes, for example), each of which may be used either to adjustably fix the sensor with the help of a small cotter pin 14 or to mould or bond the sensor, with the hole making possible an anchoring of the moulding in question.

Each of the holes corresponds, for example, to an initial ignition advance value, a positive value to the right of the axis of symmetry XX' and a negative value to the left. These different values are represented by the angles $\alpha$ with respect to axis XX' in FIG. 1.

According to the invention, the initial ignition advance angle is determined as a function of the type of vehicle involved, either by passing the cotter pin 14 through the appropriate hole in the bar 6 or by the appropriate positioning of the sensor on the bar 6 in the mould or collar of the moulding bonding element.

It is thus possible to produce, thanks to the present invention, a sensor 1 fastened to an attachment bar at one of several possible discrete positions relative to the axis XX', the position being adjustable in the case of mechanical fastening by means of a cotter pin, for example, or unadjustable in the case of the bonding or moulding of the said sensor on the bar. The bell housing 9 features, opposite the disk 5, an oblong opening 13 made during casting, whose dimensions are compatible with the various possible positions of the sensor 1 along the attachment bar 6. As this opening 13 contributes neither to the attachment of the sensor 1 nor to its aiming, it may be left unfinished after casting without requiring additional machining.

The seven possible angular position values may vary from $-6°$ to $+6°$ in increments of two degrees. These numerical indications are provided by way of example only and are not in any way to be considered to narrow the scope of the present invention.

According to one variant of manufacture, the sensor unit is made of a plastic material and the attachment bar is made of a material identical to that of the body of the sensor 1, said bar being formed either during a previous moulding operation or during the operation in which the body of the sensor is formed. In the latter case, the mould is provided with a slide portion in the shape of the arc of a circle and bearing the imprint of the bar, making it possible to vary the position of the latter with respect to the body of the sensor.

Finally, by appropriately offsetting the sensor attachment opening 13 and the pre-made holes relative to one another, it is possible to obtain said opening and to provide the said pre-made holes directly in the housing during casting and without subsequent machining, thus without making it necessary to provide the casting mould with several movable cores. According to this variant of production, the holes 10, 11, etc. in the bar 6 may be eliminated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A sensor comprising:
   an electromagnetic sensor body;
   a movable target fixed to a crankshaft of an internal combustion engine, said target being constructed and adapted to electrically influence said sensor when passing before said sensor body without contacting any element mechanically connected to said sensor body;
   a bar having a circular arcuate longitudinal axis, said axis being parallel to the path of said target;
   means for fixing said bar to a clutch bell housing for said engine such that said bar is stationarily fixed adjacent said target; and
   means defining a plurality of discrete predetermined adjustment positions for said sensor body along said axis, whereby said sensor body may be fixed to said bar at a selected one of said adjustment positions so that the angular position and velocity of said crankshaft can be detected.

2. The sensor of claim 1 including means for selectively changeably securing said sensor body to one of said predetermined adjustment positions.

3. The sensor of claim 1 including means for permanently securing said sensor body to one of said predetermined adjustment positions.

4. The sensor of claim 1 or 2 or 3 including an aperature in said housing into which said sensor body extends, wherein said means defining predetermined adjustment positions comprises holes in said housing, said holes offset from said aperature, said aperature and said holes being formed by casting and without machining.

* * * * *